United States Patent
Larsson et al.

(10) Patent No.: US 6,895,753 B2
(45) Date of Patent: May 24, 2005

(54) EXHAUST TURBINE APPARATUS

(75) Inventors: Per Larsson, Gothenburg (SE);
Nils-Olof Håkansson, Stenkullen (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 10/707,555

(22) Filed: Dec. 20, 2003

(65) Prior Publication Data

US 2004/0112054 A1 Jun. 17, 2004

Related U.S. Application Data

(63) Continuation-in-part of application No. PCT/SE01/01459, filed on Jun. 26, 2001.

(51) Int. Cl.⁷ .......................... F01N 5/04; F01D 13/02; F02B 37/00; F02B 41/10; F02G 5/02
(52) U.S. Cl. ........................................ 60/624
(58) Field of Search ................ 60/602, 605.1, 60/624; 123/323, 559.1; 415/110–113, 116, 175

(56) References Cited

U.S. PATENT DOCUMENTS

| | | | |
|---|---|---|---|
| 4,586,337 A | * 5/1986 | Fox | 60/624 |
| 4,648,790 A | 3/1987 | Horler | 415/112 |
| 4,884,407 A | * 12/1989 | Hatanaka | 60/624 |
| 5,323,610 A | 6/1994 | Fransson et al. | 60/339 |
| 5,555,730 A | * 9/1996 | Hope | 60/606 |
| 5,564,896 A | 10/1996 | Beeck et al. | 415/175 |
| 5,884,482 A | * 3/1999 | Lange et al. | 60/624 |

FOREIGN PATENT DOCUMENTS

| | | | | |
|---|---|---|---|---|
| DE | 962764 | * | 4/1957 | 60/624 |
| EP | 0171882 A1 | | 2/1986 | |

* cited by examiner

Primary Examiner—Sheldon J Richter
(74) Attorney, Agent, or Firm—Novak Druce & Quigg, LLP

(57) ABSTRACT

Apparatus and method for supplying sealing air to an exhaust turbine (15) that interacts with an internal combustion engine for turbo-compound operation in a vehicle. Exhaust gases from the internal combustion engine are received in an exhaust system having a supercharger turbine (11) and which drives a compressor (13) for the engine combustion air. Residual energy in the exhaust gas flow is recovered via the exhaust turbine (15) for transfer to the crankshaft of the internal combustion engine. The exhaust turbine (15) is supported in a bearing housing (32), which is fed with sealing air via a fluid line (36). The exhaust system includes an exhaust brake throttle (16) having an exhaust gas pressure regulator (22) for regulating the exhaust brake pressure. The exhaust gas pressure regulator (22) is connected via a compressed air line (28) to a compressed air source (29, 30), which can be connected in parallel to the bearing housing (32) via a prioritizing valve (35) and a compressed air line (36).

12 Claims, 5 Drawing Sheets

US 6,895,753 B2

EXHAUST TURBINE APPARATUS

CROSS REFERENCE TO RELATED APPLICATIONS

The present application is a continuation patent application of International Application No. PCT/SE01/01459 filed 26 Jun. 2001 which was published in English pursuant to Article 21(2) of the Patent Cooperation Treaty. Said application is expressly incorporated herein by reference in its entirety.

BACKGROUND OF INVENTION

1. Technical Field

The present invention relates to a method and an apparatus for supplying sealing air to an exhaust turbine, which interacts with an internal combustion engine for turbo-compound operation in a vehicle. The exhaust gases from the internal combustion engine being received in an exhaust system having a supercharger turbine that drives a compressor for the engine combustion air. Residual energy in the exhaust gas flow is recovered via the exhaust turbine for transfer to the crankshaft of the internal combustion engine. The exhaust turbine is supported in a bearing housing, which is fed with sealing air via a fluid line, and the exhaust system includes an exhaust brake throttle having an exhaust gas pressure regulator for regulating the exhaust brake pressure.

2. Background

In a turbo-compound engine, an exhaust turbine, for example an axial-flow turbine, is used to recover residual energy from the exhaust gases of an internal combustion engine after the exhaust gases have been used to drive a turbocompressor that compresses engine charge-air. The exhaust gases drive the exhaust turbine at a speed of up to approximately 90,000 revolutions per minute (rpm). In a bearing housing, seals are used on the exhaust turbine drive shaft in order to prevent lubricating oil from escaping and to prevent gases from leaking in. Due to the high operating speeds and temperatures, the seals are exposed to great stress.

A known method for improving the functioning of the exhaust turbine seals is to pressurize the bearing housing by way of a pressure line and a bore. In this manner, an overpressure in relation to the ambient pressure is maintained between two seals in the bearing housing. A certain proportion of this buffer pressure is allowed to pass through the outer seal out into the exhaust system and the remainder passes through the inner seal and reaches the inside of the crankcase.

Under normal operating conditions, a negative pressure prevails on the outlet side of the exhaust turbine rotor. This is due to the centrifugal effects (forces). On the other side of the seals, the crankcase pressure prevails (normally a slight overpressure in relation to the atmospheric pressure). In the absence of any buffer pressure, which amounts to approximately 0.5 bar gauge, the pressure differential might normally lead to an oil leakage.

On activation of an exhaust brake, which is located downstream of the exhaust turbine and comprises (includes, but is not limited to) a throttle for stopping the exhaust gas flow through exhaust ports of the internal combustion engine, the pressure upstream of the exhaust brake throttle can rise to approximately 5 bar gauge, and the gas temperature can reach approximately 700 degrees Celsius. This pressure and temperature rise means that when engine braking, the seals are instantaneously exposed to much greater stresses than under other operating conditions. As a result, very hot and not particularly clean gases can leak into the bearing housing if the overpressure therein is not increased to a correspondingly higher level. The hot gas may mean that the working temperature of the seals and the bearing are exceeded, which may have an adverse effect on the reliability of the system. In order to ensure that exhaust gases do not enter into the bearing housing, the buffer pressure in the bearing housing should therefore be kept somewhat higher than the pressure in the exhaust brake.

Accordingly, the buffer pressure in the bearing housing should therefore be between 0.5 and 6.0 bar gauge, depending on experienced operating conditions. Theoretically, it should be possible to maintain the higher pressure level at all times, but this leads to a high air consumption and the constant delivery of a high volumetric flow to the crankcase. This also means that no air source other than the mechanical compressor of the vehicle could be used in order to deliver the high pressure, which means that unacceptably high parasitic losses occur in the internal combustion engine.

SUMMARY OF INVENTION

An object of the present invention therefore is to provide a method an apparatus for supplying sealing air to an exhaust turbine that does not give rise to undue parasitic losses that effect the efficiency of the internal combustion engine.

To this end, the invention is characterized in that an exhaust gas pressure regulator is connected via a first compressed air line to a compressed air source that can be connected in parallel to the bearing housing via a prioritizing valve and a compressed air line.

The control valve also suitably enables the bearing housing to be connected to the engine inlet manifold via a compressed air line.

According to an advantageous exemplary embodiment of the exhaust brake throttle, an exhaust throttle valve is included that is located in the exhaust system downstream of the exhaust gas pressure regulator.

The exhaust gas pressure regulator suitably consists of a piston valve that comprises a first piston surface that is acted upon by the exhaust gas pressure when the exhaust brake throttle is closed, and a second opposed piston surface, which is firmly connected to the first piston surface and is acted upon by the pressure in the compressed air line.

According to a further advantageous exemplary embodiment of the invention, the second piston surface has a somewhat smaller area than the first piston surface, the piston valve being capable of opening a bypass line bypassing the exhaust brake throttle should the first piston surface of the piston valve be acted upon by an exhaust gas pressure smaller than the pressure prevailing in the circuit which is formed by the compressed air lines and the prioritizing valve and which delivers pressure to the second piston surface of the piston valve or to the bearing housing.

The compressed air line is suitably connected to a valve unit that is located between the compressed air source and the prioritizing valve, and supplies excess pressure that can vary from a standby level to a higher level that is adjustable in proportion to the desired engine brake power.

In a normal engine operating situation, the prioritizing valve can deliver sealing air to the bearing housing from the engine inlet manifold.

In a low engine load situation, the prioritizing valve can deliver sealing air to the bearing housing from the compressed air line at a pressure equal to the standby level.

In an engine braking situation, the prioritizing valve can deliver sealing air to the bearing housing from the compressed air line at a pressure equal to a higher pressure level.

BRIEF DESCRIPTION OF DRAWINGS

The invention will be described in more detail below with reference to exemplary embodiments, which are shown in the accompanying drawings, in which.

DETAILED DESCRIPTION

Figure 1:
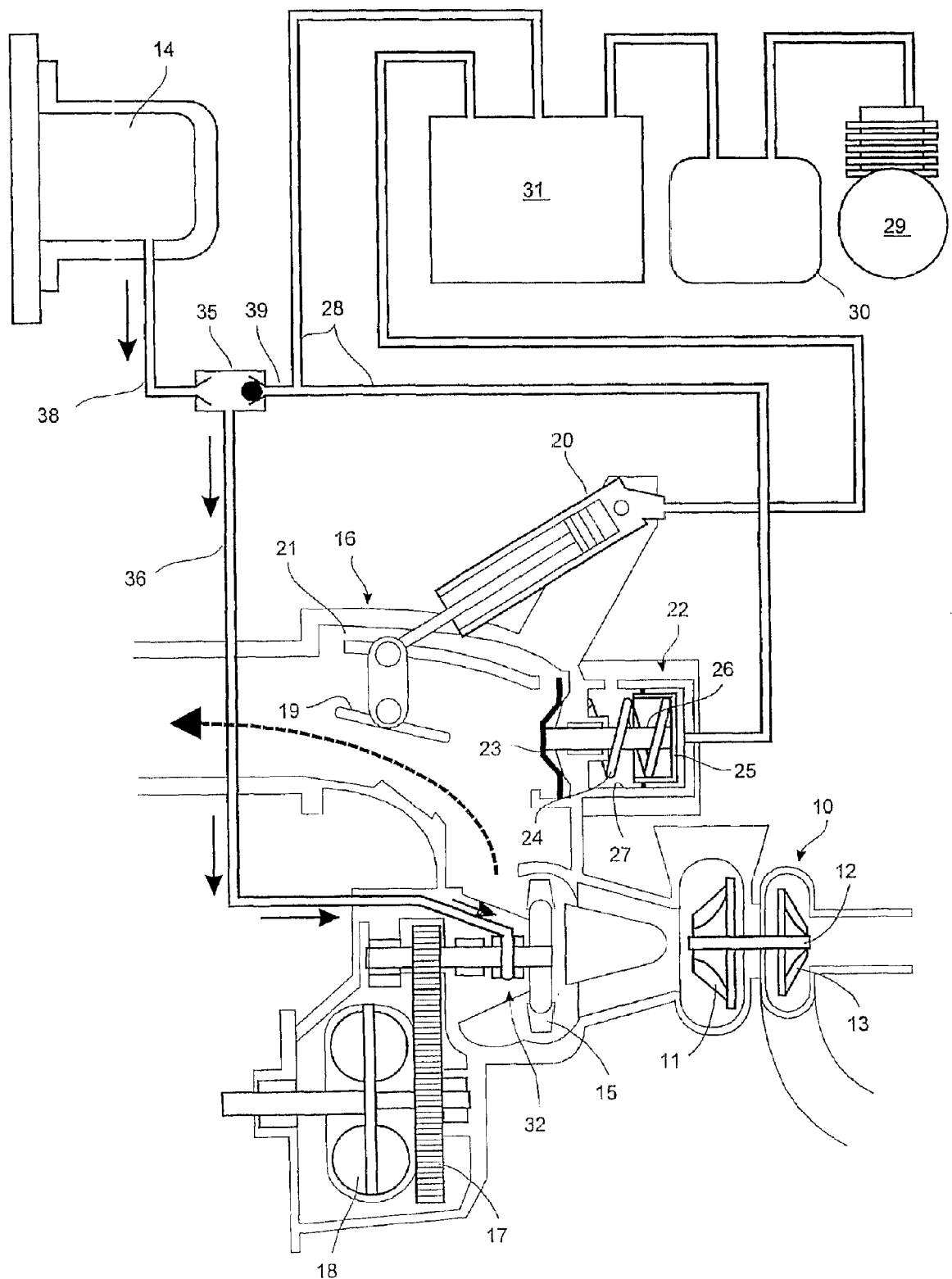
FIG. 1 is a schematic diagram showing a first exemplary embodiment of an apparatus configured according to the teachings of the present invention implemented in a first application.
Figure 2:
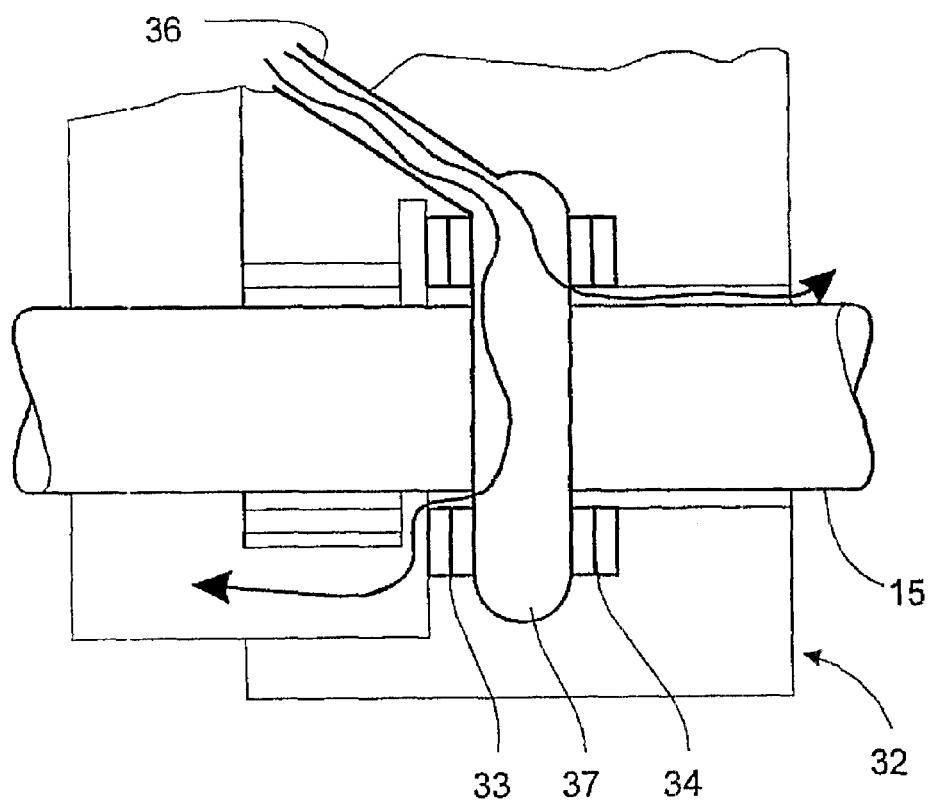
FIG. 2 is a larger scale, more detailed diagram showing the bearing housing forming part of the arrangement for FIG. 1.

The apparatus shown in the Figures is configured to be utilized in an internal combustion engine of essentially conventional design and being of the turbo-compound type. A preferred embodiment incorporates the arrangement as part of the drive unit of a heavy truck or bus. The incorporating engine is preferably of the direct injection diesel engine type, in which a supercharger 10, with an exhaust-driven turbine 11 and compressor 13, is arranged on the turbine shaft 12 and is used for compressing and supplying combustion air to the engine. Inlet air is supplied to the compressor 13 for compressing, following which the compressed air can be cooled if it is passed through a charge air cooler before being delivered to the engine inlet manifold 14, in which an overpressure of 0.0–2.3 bars normally prevails.

Engine exhaust gases are collected in the conventional way in an exhaust plenum chamber to be led to the turbine 11 of the supercharger 10 for driving the compressor 13. The exhaust gases are then further communicated, via a second exhaust turbine (which in the exemplary illustrated embodiment takes the form of an axial-flow turbine 15) and an exhaust brake apparatus 16 to a silencer unit where exhaust emission control equipment may be included.

The axial-flow turbine 15 is used in turbo-compound engines in order to recover residual energy from the exhaust gases once they have passed through the turbine of the supercharger. The exhaust gases drive the power turbine at very high speeds of up to approximately 90,000 rpm at normal engine speed, which in the case of a diesel engine for heavy trucks means a speed of approximately 1,500–2,500 rpm. The torque obtained is transmitted to the crankshaft of the internal combustion engine via, among other things, a transmission 17, which reduces the speed, and a hydrodynamic coupling 18, which mechanically isolates the transmission 17 from the engine crankshaft.

The exhaust brake apparatus 16 comprises a throttle 19, which can be operated between two limit positions by means of a servo element 20 for rapid the throttle shifting between a fully open position and a fully closed position. The exhaust brake apparatus further comprises a bypass line 21 that bypasses the throttle 19 and which can be controlled by means of an exhaust brake regulator in the form of a piston valve 22 located upstream of the throttle 19. A first piston surface 23 is acted upon by the exhaust gas pressure when the exhaust brake throttle is closed, the piston surface 23 being pressed against the action of an helical coil spring 24 so that the bypass line 21 is opened. A second piston surface 25 is firmly connected to the piston surface 23 by way of a rod 26 and is displaceably supported in a cylinder 27.

A regulating air pressure acts on the piston surface 25 by way of a compressed air line 28 that is connected to a compressed air system forming part of the vehicle. This same compressed air system is also typically used to generate power for auxiliary units in the vehicle, such as the brake system and the system for pneumatic operation of the vehicle gearbox. Among other things, this compressed air system comprises a compressor 29, an accumulator tank 30 and a valve housing 31. An overpressure of approximately 8.5 bar is normally maintained in the tank 30. The overpressure in the compressed air line 28 downstream of the valve housing for the exhaust brake system in turn amounts to approximately 0.5–7.5 bar.

Due to the fact that the second piston surface 25 of the piston valve 22 has a somewhat smaller diameter than the first piston surface 23, the piston valve 22 will be able to react during engine braking and open the bypass line 21 bypassing the exhaust brake throttle 16, should the first piston surface 23 be acted upon by an exhaust gas pressure which is less than the pressure prevailing in the compressed air line 29, and will thus act against the second piston surface 25. For example, the piston surface 23 may have a diameter of 90 mm while the piston surface 25 has a diameter of 84 mm, the piston valve 22 being capable of reacting to an exhaust brake pressure that is approximately 15% lower than the system pressure.

The axial-flow turbine 15 comprises a bearing housing 32 provided with two seals 33 and 34, of which one seals off the crankcase pressure and the other seals off the exhaust gas pressure acting on the exhaust brake apparatus 16, the overpressure possibly amounting to approximately 5 bar during braking. A compressed air line 36 connected to the compressed air system via a prioritizing valve 35 opens out into a space 37 between the two seals 33, 34 and supplies a buffer pressure which is intended to prevent hot exhaust gases containing pollutants from getting into bearings of the axial-flow turbine. The buffer pressure between the seals should maintain a pressure that is approximately 0.5 bars higher than the pressure on the outside of the bearing housing. The prioritizing valve 35 is connected to the engine inlet manifold 14 via a first branch line 38 and to the compressed air line 28 via a second branch line 39.

During operation of the engine (see FIG. 1), the bearing housing is normally supplied with sealing pressure from the inlet manifold 14. If the engine is driven at low load (see FIG. 3), the pressure in the inlet manifold 14 falls permitting the prioritizing valve 35 to open to the compressed air system via the lines 39 and 28 as soon as the overpressure of 0.5 bars, for example, that is prevailing in the compressed air system exceeds the pressure in the inlet manifold.

The valve unit 31 supplies overpressure which may vary from the standby level of 0.5 bar gauge to a higher level, which is adjustable in proportion to the required engine brake power. To this end, the valve unit is connected to an engine control unit 40 (see FIG. 5), which is designed to adjust the higher level of overpressure with reference to various parameters, such as information on the brake pedal pressure and ABS system, so that the braking power is optimized in relation to engine driving and the state of the road.

When braking (see FIG. 4), the pressure in the exhaust brake housing increases and a higher pressure has to be used, the prioritizing valve therefore switching over so that the higher sealing pressure is drawn from the compressed air system. As has been described previously with reference to the piston valve 22, the exhaust brake pressure will throughout operation maintain a level lower than the varying control pressure, which in engine braking is delivered to the bearing housing 32 via the prioritizing valve 35 and the compressed air line 36, so that the pressure between the seals will at all times exceed the exhaust gas pressure on the outside of the seal 34.

Different levels of buffer pressure can therefore be delivered to the bearing housing, without the need for frequent activation of the compressor of the compressed air system. This means that a minimum of additional components and piping is needed in order to achieve the stated object.

Figure 3:
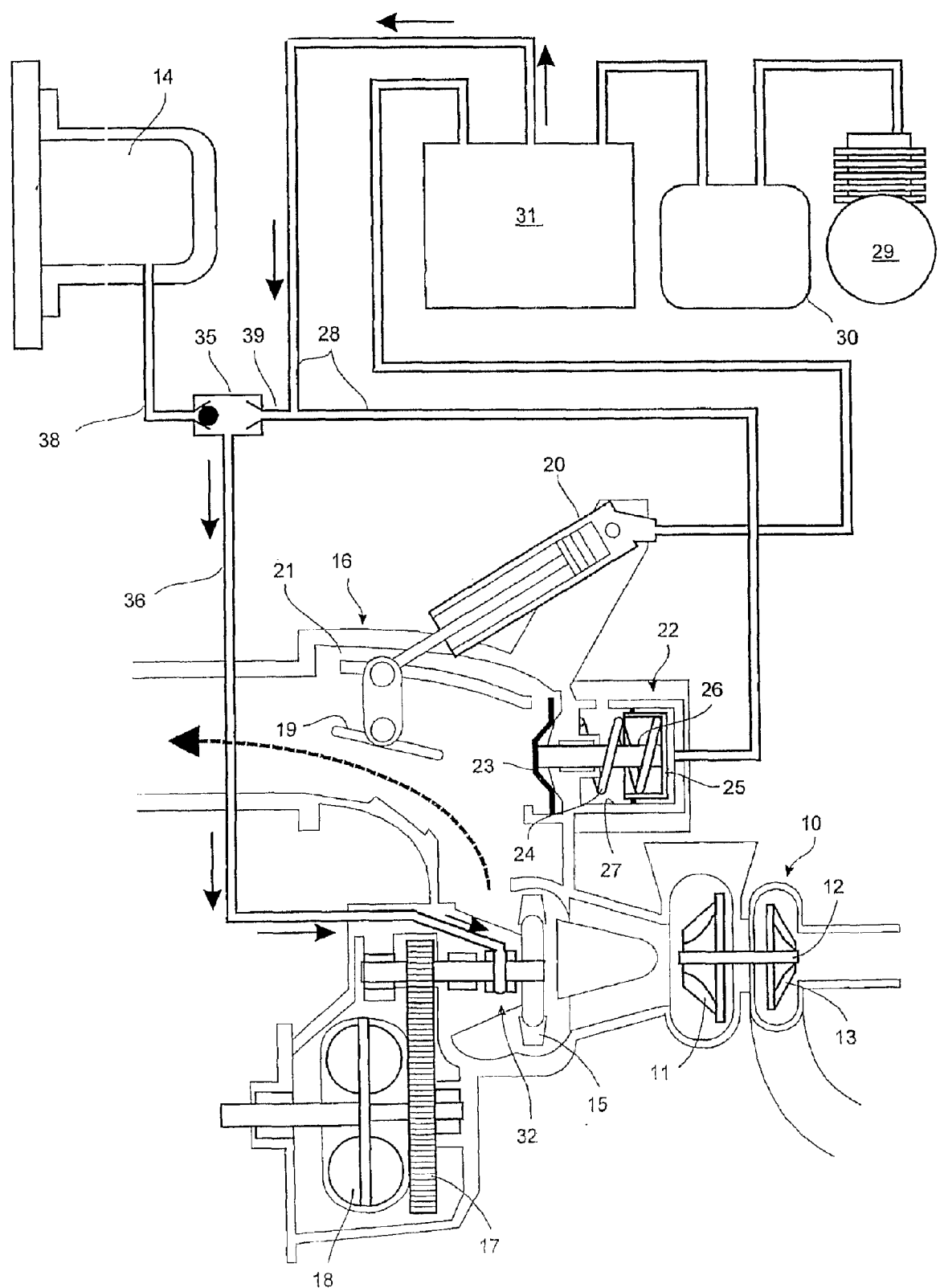
FIG. 3 is a schematic diagram corresponding to FIG. 1 and showing the apparatus in a second application.
Figure 4:
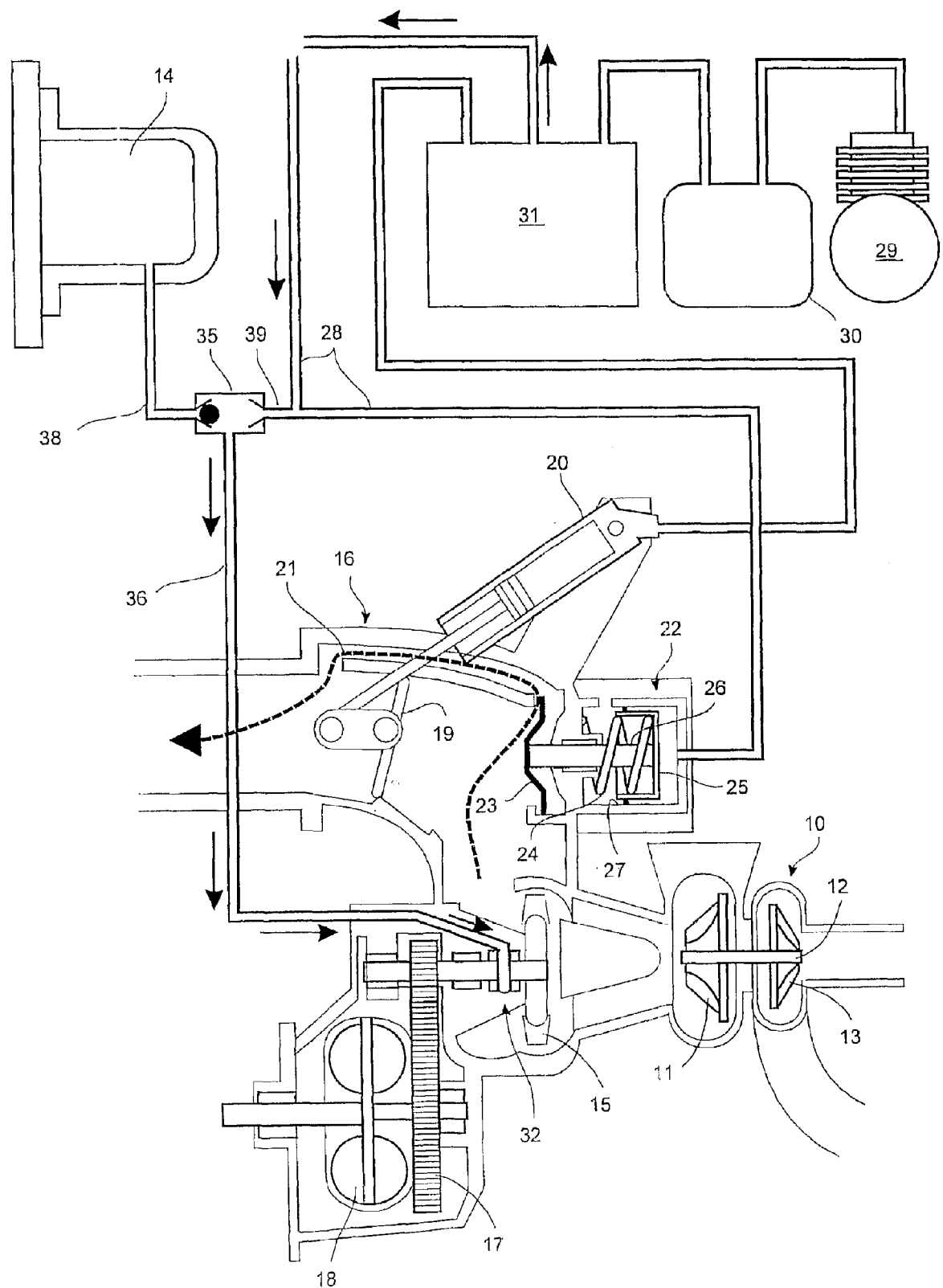
FIG. 4 is a schematic diagram showing the apparatus in a third application.
Figure 5:
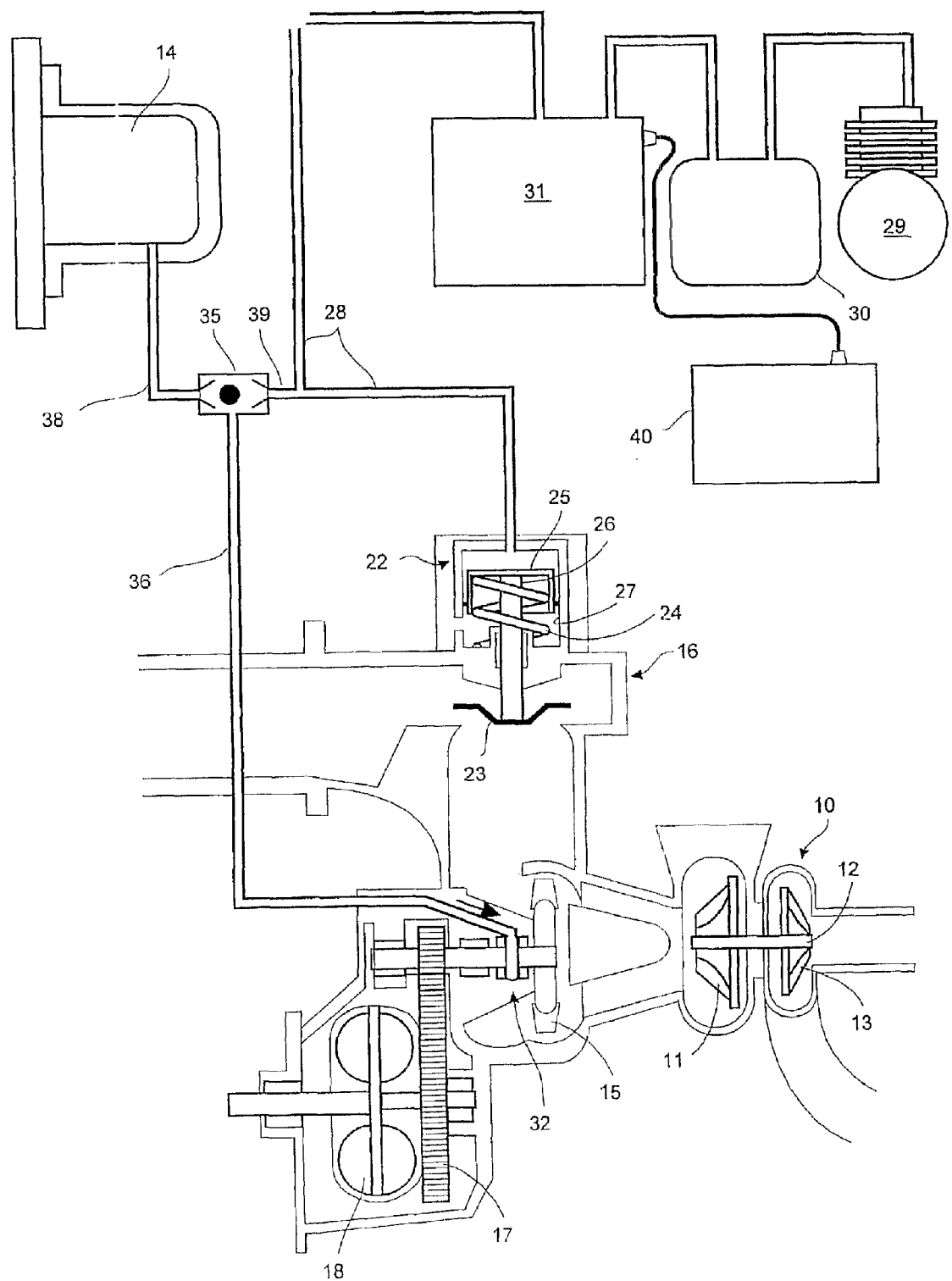
FIG. 5 is a schematic diagram illustrating a second exemplary embodiment of an apparatus configured according to the present invention.

FIG. 5 shows a variant of the invention in which the exhaust brake regulator 16 is designed differently from that in FIGS. 1, 3 and 4. Thus the exhaust duct is L-shaped and the piston valve 22 is inserted in the angle between the two duct sections. The throttle 19 and the bypass line 21 are not required in this case, since the shift from normal operation to exhaust braking is brought about by the piston valve 22 being moved from an inner, inoperative position to the outer operative position shown in FIG. 5. In this position, the piston surface 23 seals off the exhaust duct at a pressure that is determined by the valve housing 31 and the engine control unit 40 so that excess pressure can leak past the piston surface 23. The variant of the invention shown in FIG. 5 is less expensive to produce than the solutions shown in FIGS. 1, 3 and 4, but can result in a greater pressure drop in the exhaust duct.

The invention must not be regarded as being limited to the exemplary embodiments described above, a number of further variants and modifications being feasible without departing from the scope of the patented claims.

What is claimed is:

1. An apparatus for supplying sealing air to an exhaust turbine (15), said exhaust turbine (15) which interacts with an internal combustion engine for turbo-compound operation in a vehicle, exhaust gases from the internal combustion engine being received in an exhaust system having a supercharger turbine (11), which drives a compressor (13) for the engine combustion air, residual energy in the exhaust gas flow being recovered via the exhaust turbine (15) for transfer to the crankshaft of the internal combustion engine, the exhaust turbine (15) being supported in a bearing housing (32), which is fed with sealing air via a fluid line (36), and the exhaust system comprising an exhaust brake throttle (16) having an exhaust gas pressure regulator (22) for regulating the exhaust brake pressure, the exhaust gas pressure regulator (22) is connected via a compressed air line (28) to a compressed air source (29, 30) connectable in parallel to the bearing housing (32) via a prioritizing valve (35) and a compressed air line (36).

2. The apparatus as recited in claim 1, wherein the prioritizing valve (35) enables the bearing housing (32) to be connected to the engine inlet manifold (14) via a compressed air line (38).

3. The apparatus as recited in claim 1, wherein the exhaust brake throttle (16) comprises an exhaust throttle valve (19) located in the exhaust system downstream of the exhaust gas pressure regulator (22).

4. The apparatus as recited in claim 1, wherein the exhaust gas pressure regulator comprises a piston valve (22) having a first piston surface (23) acted upon by the exhaust gas pressure when the exhaust brake throttle (16) is closed, and a second opposed piston surface (25) which is firmly connected to the first piston surface and is acted upon by the pressure in the compressed air line (28).

5. The apparatus as recited in claim 4, wherein the second piston surface (25) has a smaller area than the first piston surface, the piston valve (22) being capable of opening a bypass line (21) bypassing the exhaust brake throttle (16) when the first piston surface (23) of the piston valve be acted upon by an exhaust gas pressure smaller than the pressure prevailing in the circuit which is formed by the compressed air lines (28, 36) and the prioritizing valve (35) and which delivers pressure to the second piston surface (25) of the piston valve or to the bearing housing (32).

6. The apparatus as recited in claim 1, wherein the compressed air line (28) is connected to a valve unit (31) located between compressed air source (29, 30) and the prioritizing valve (35) and which supplies an overpressure variable from a standby level to a higher level adjustable in proportion to the required engine brake power.

7. The apparatus as recited in claim 1, wherein during normal engine operation, the prioritizing valve (35) delivers sealing air to the bearing housing (32) from the engine inlet manifold (14).

8. The apparatus as recited in claim 1, wherein during low engine load operation, the prioritizing valve (35) delivers sealing air to the bearing housing (32) from the compressed air line (28) at a pressure equal to the standby level.

9. The apparatus as recited in claim 1, wherein under engine braking conditions, the prioritizing valve (35) delivers sealing air to the bearing housing (32) from the compressed air line (28) at a pressure equal to a higher pressure level.

10. A method for maintaining an overpressure condition in a bearing housing of an exhaust gas turbine that constitutes a portion of a vehicle-powering turbo-compound internal combustion engine arrangement, said method comprising:

supplying overpressure air of a first magnitude to a bearing housing of an exhaust gas turbine constituting a portion of a vehicle-powering turbo-compound internal combustion engine arrangement during non-engine braking operating conditions of the incorporating vehicle; and increasing the magnitude of the supplied overpressure air to the bearing housing responsive to the detection of a transition from non-engine braking operating conditions to engine braking operating conditions to a second magnitude.

11. The method as recited in claim 10, further comprising:

utilizing a reciprocating piston arrangement having two oppositely acting piston surfaces to detect transitions between non-engine braking operating conditions and engine braking operating conditions.

12. The method as recited in claim 10, further comprising:

pressuring said bearing housing utilizing supercharged engine inlet air during non-engine braking operating conditions; and increasing the magnitude of the supplied overpressure air to the bearing housing utilizing, at least partially, pressured air from an onboard compressed air supply also utilized for supplying other vehicle subsystems.

* * * * *